Patented June 22, 1948

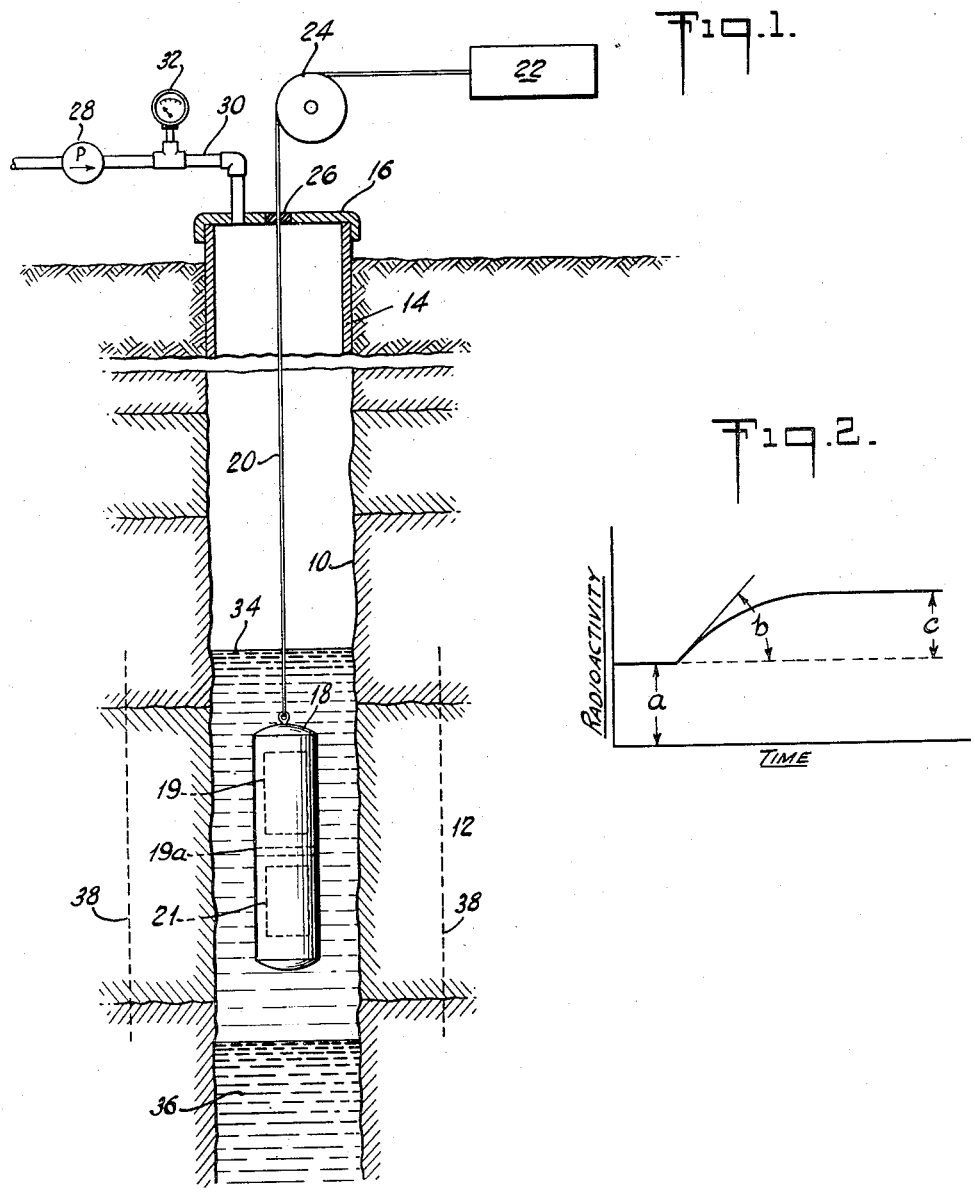

2,443,680

UNITED STATES PATENT OFFICE 2,443,680

METHOD OF DETERMINING THE NATURE OF SUBSTRATA

Gerhard Herzog, Houston, Tex., assignor to The Texas Company, New York, N. Y., a corporation of Delaware Application April 4, 1944, Serial No. 529,488

6 Claims. (Cl. 250—83)

1

This invention relates to the determination of the nature of substrata and more particularly to a method of determining or measuring the permeability or the porosity, or both, of an underground formation.

The determination of the permeability and porosity of formations surrounding a bore hole or a well is becoming increasingly important to those engaged in the prospecting for, or the locating of, oil deposits and in the producing of oil from such deposits. The term "permeability" or more strictly "normal permeability" refers to a property of the rock or formation itself and is determined by measuring the resistance offered to the flow of a fluid through the formation under conditions of viscous flow. The permeability of rocks which may contain oil has been found to vary from almost zero to as high as 25 darcys. Generally speaking, cores of producing sands may show permeability ranging between 50 and 2000 millidarcys.

The effective porosity of a rock or formation is the ratio of the volume of interconnected pore space to the total bulk volume of the rock expressed as a percentage. The porosity of a rock may vary from almost zero to as high as 60%, with most oil-bearing rocks having porosities between 10 and 40%.

It is well known that oil deposits commonly occur in the vicinity of highly porous structures or formations, but aside from the obvious desirability of locating these structures in the search for oil, the permeability and porosity of the formations are important in other considerations. Thus, in designing equipment to be used in connection with oil producing, the size and nature of desalting and dehydrating equipment, the size of pumps required where water drive is used to force oil through the pore spaces into the well, etc., may depend to a large extent on the porosity and the permeability of the producing formation.

Porosity and permeability measurements have been made by studying core samples obtained either during the drilling of the well or afterwards by means of suitable coring equipment. The obtaining and analyzing of core samples are time consuming operations and the accuracy of results obtained usually is proportional to the number of cores taken. Among other prior methods of measuring permeability and porosity are those involving electrical measurements of potentials created by liquid infiltration through porous media. In making these measurements much care must be exercised, polarization of the measuring electrodes must be eliminated or accounted for, and errors caused by electrochemical action are not uncommon.

In accordance with the present invention a bore hole, or that portion of a bore hole opposite a formation to be examined, is filled with a fluid containing a substance which will release gamma rays when bombarded with neutrons. A gamma ray detecting device together with a source of neutrons suspended from a cable is lowered through the hole to a point opposite the formation to be studied, and pressure is then applied to the liquid. If the formation is porous to any appreciable extent some of the liquid will be forced into the pore spaces of the formation. Gamma rays will be released due to the bombardment of the liquid by neutrons and, if the pressure on the liquid is maintained constant, the rate of flow of the liquid into the formation and the attendant increase in gamma radiation from the formation will be indicative of the permeability of that formation. By means of the gamma radiation detector and an indicating or recording device at the surface, measurements are made of the radioactivity during the period when the liquid is passing into the pore spaces of the formation. As before stated, the rate of increase in the gamma radiation from the formation will be indicative of the formation's permeability. After a time, depending of course upon the pressure exerted and the permeability and porosity of the formation, the increase in radioactivity will cease. The total amount, or rather the amount of increase in radioactivity in the formation due to the forcing into the pore spaces of the liquid, will provide an indication of the porosity of the formation.

For a better understanding of the invention reference may be had to the accompanying drawing in which Figure 1 is a vertical elevation through a portion of a bore hole or well showing an apparatus for measuring gamma radiation from a formation into the pore spaces of which a liquid containing a substance capable of releasing gamma radiation when bombarded by neutrons is being forced, and Figure 2 is a curve showing the increase of radioactivity of a formation with respect to time.

In Figure 1 of the drawing a bore hole 10 is shown as having been drilled through various formations or strata, including the formation 12, the permeability and porosity of which it is desired to determine. A casing 14 is shown in the upper portion of the hole and is provided with a suitable casing head 16. Within the hole 10 and at a depth such as to be opposite a portion of formation 12 is a housing 18 containing a gamma ray detector 19 and a source of neutrons 21, which may be a mixture of radium and beryllium, the output or response of the detector passing through the suspending cable 20 to a suitable indicating or recording device 22 at the surface. A suitable shield 18a is disposed between the source 21 and detector 19 to prevent radiation from the source passing directly to the detector. This shield may be formed of a layer of lead, a layer of paraffin and a layer of cadmium, the lead being toward the source and the cadmium toward the detector. The cable 20 is shown as passing over the pulley or drum of device 24 by means of which the depth or position of the housing 18 in the hole can be measured. Preferably the cable 20 passes through a resilient packing or gland 26 in the casing head 16. A pump or compressor 28 is connected to the interior of the well by means of a pipe 30 to which is attached a suitable pressure gauge 32. If the formation 12 to be studied is at the bottom or near the bottom of the hole, a liquid 34, containing a substance either in solution or suspension from which gamma rays will be released when bombarded by neutrons, is placed in the hole and a sufficient amount is used to reach a level at an appreciable distance above the top of the housing 18. In case the formation 12 is at some considerable distance above the bottom of the hole a liquid or solution such as drilling mud 36 may be placed in the lower portion of the hole and a lighter liquid containing the substance to be bombarded by neutrons then placed on top of the lower liquid.

After the liquid 34 is in position, pressure is applied to the well by means of the pump 28, and the pressure is preferably maintained at a constant value by observation of the meter 32. Before starting the pump 28, the gamma radiation detector 19 is connected and the instrument 22 will indicate or record the gamma radiation from the formation 12 plus a constant amount of radiation caused by the liquid 34 surrounding the detector. This response or output of the detector is indicated in the curve of Figure 2 at $a$, and should be substantially constant up until the time the pressure is applied to the liquid by means of the pump 28. At that point some of the liquid 34 containing the substance reactive to neutron bombardment will begin to enter the pore spaces of the formation 12 and the response of the detector will indicate an increase in gamma radiation, the rate of which will depend upon the permeability of the formation and the amount of pressure applied to the liquid. In Figure 2 the angle $b$, which is the initial slope of the curve, indicates the permeability of the formation. The pressure on the liquid 34 is maintained constant until no further increase in gamma radiation is noted.

Both the neutrons from the source and the gamma radiation released in the fluid in the formation due to bombardment by the neutrons have limited penetration. The diameter of the cylinder represented by the dotted line 38 defines the volume of the formation in which useful gamma radiation is released, some of which will strike the detector 19. When the pore spaces of that portion of the formation within the cylinder are full of the liquid 34, the curve of Figure 2 will have reached the horizontal. The total increase in gamma radiation from the formation after the pressure is applied to the liquid 34 is represented by the distance $c$ in Figure 2 and is indicative of the porosity of the formation. In determining the permeability and porosity from the curve of Figure 2, the strength of the neutron source must of course be borne in mind as well as the amount of pressure applied to the liquid.

As before stated, it is desirable that the liquid 34 extend for some distance both above and below the housing 18. The detector 19 is of course responsive to the gamma rays released by the liquid 34 in the hole itself for a certain distance above the detector and, if the level of the liquid should be lowered below this distance due to the pressure applied to its upper surface, an error in the response of the detector would probably result.

There are many substances soluble in water or oil which may be used in the liquid 34 so that gamma rays will be released when the liquid is bombarded with neutrons and among these may be mentioned the salts of sodium, magnesium, aluminum, silicon and chlorine. For a list of other substances which would be satisfactory, reference may be had to "Reviews of Modern Physics," volume 9, pages 346 and 347 published for the American Physical Society by the American Institute of Physics, New York, N. Y.

Although the bore hole opposite the formation 12 is shown as uncased, the invention may also be used in a cased hole, it merely being necessary to suitably perforate the portion of the casing opposite the formation where the tests are to be made so that the liquid can flow through the perforations and be forced into the pore spaces of the surrounding formation.

The detector 19 may be any suitable device responsive to gamma radiation produced by bombardment of the liquid 34 by neutrons. Thus a Geiger-Muller counter, an ionization chamber or proportional counter will be suitable. Naturally, the more sensitive the radiation detector, the more effective will be the method of the invention.

Certain formations, when bombarded with neutrons, will themselves emit gamma rays. If this gamma radiation from the formations is large as compared to the gamma radiation from the substance forced into the formations, the measurements may be somewhat inaccurate, but this unwanted effect can be minimized by a proper choice of the substance forced into the formations. Furthermore the gamma rays which are released under neutron bombardment have energies which are characteristic and different for various substances. If the gamma rays which are released under neutron bombardment from the formations themselves are different from those of the injected substance, the two effects can be separated by the use of a detector which is selective to the energy of the gamma rays. For example, this selection can be accomplished by surrounding the detector with suitable screens of absorbing material.

It is possible that a situation would arise where the diameter of the hole is greater than the diameter of the cylinder indicated by the lines 38. In such a case it is contemplated that the housing 18 would be provided with means such as one or more spring pressed arms for forcing it against one side of the hole wall. In this case the detector 19 would be provided with a shield around its back side so that it would be responsive only to radiation reaching it from that side of the formation against which the housing is pressed.

Obviously many modifications and variations of the invention, as hereinbefore set forth, may be made without departing from the spirit and scope thereof, but only such limitations should be imposed as are indicated in the appended claims.

I claim:

1. A method of determining the permeability of an underground formation which comprises forcing into the pore spaces of said formation a fluid containing a substance which becomes radioactive when bombarded by neutrons, while bombarding the formation with neutrons and measuring the change in radioactivity of the formation with respect to time.

2. A method of determining the permeability of an underground formation traversed by a bore hole which comprises placing in said hole a fluid containing a substance which, when bombarded by neutrons, will produce gamma rays, applying pressure to force a portion of the fluid into the pore spaces of the formation, bombarding the formation with neutrons, measuring the radioactivity of the formation while the pressure is applied and during said bombardment, and determining the rate of increase in the radioactivity of the formation.

3. A method of determining the permeability of an underground formation traversed by a bore hole which comprises placing in said hole a fluid containing a substance which, when bombarded by neutrons, will produce gamma rays, applying a constant pressure to force a portion of the fluid into the pore spaces of the formation, bombarding the formation with neutrons, measuring the radioactivity of the formation while the pressure is applied, and determining the rate of increase in the radioactivity of the formation.

4. A method of determining the permeability and porosity of an underground formation traversed by a bore hole which comprises placing in said hole a fluid containing a substance which is capable of becoming radioactive when bombarded by neutrons, forcing a portion of said fluid into the pore spaces of the formation over a period of time while bombarding the formation with neutrons, measuring the rate of increase in radioactivity of the formation to determine the permeability of the formation and, after further increase has ceased, measuring the total increase in radioactivity of the formation, the total increase providing an indication of the porosity of the formation.

5. A method of determining the permeability and porosity of an underground formation traversed by a bore hole which comprises placing in said hole a liquid containing a substance which is capable of releasing gamma rays when bombarded by neutrons, forcing a portion of said liquid into the pore spaces of the formation over a period of time while bombarding the formation with neutrons, measuring the rate of increase in gamma radiation of the formation to determine the permeability of the formation and, after further increase in gamma radiation has ceased, measuring the total amount of increase in radioactivity of the formation, the total increase providing an indication of the porosity of the formation.

6. A method of determining the permeability and porosity of an underground formation traversed by a bore hole which comprises placing in said hole an aqueous solution of sodium chloride, applying pressure to force a portion of said solution into the pore spaces of the formation while bombarding the formation with neutrons to create gamma rays, measuring the rate of increase in gamma radiation of the formation to determine the permeability of the formation and, after further increase in radiation has ceased, measuring the total increase in gamma radiation of the formation, the total increase in said gamma radiation providing an indication of the porosity of the formation.

GERHARD HERZOG.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,352,993 | Albertson | July 4, 1944 |
| 2,358,945 | Teichman | Sept. 26, 1944 |